US012629841B2

(12) United States Patent　　　(10) Patent No.:　US 12,629,841 B2
Krieg et al.　　　　　　　　　　　　(45) Date of Patent:　　　May 19, 2026

(54) METHOD FOR DETERMINING A MINIMUM DISTANCE BETWEEN AN OBJECT AND AN APPARATUS SURFACE, SAFETY DEVICE FOR A HANDLING APPARATUS HAVING AN APPARATUS SURFACE, AND HANDLING APPARATUS

(71) Applicant: ROUNDPEG TECHNOLOGIES GMBH, Aschheim (DE)

(72) Inventors: Oliver Krieg, Aschheim (DE); Etienne Eichstaedt, Aschheim (DE); Hermann Wieser, Aschheim (DE)

(73) Assignee: ROUNDPEG TECHNOLOGIES GMBH, Aschheim (DE)

( * ) Notice: Subject to any disclaimer, the term of this patent is extended or adjusted under 35 U.S.C. 154(b) by 148 days.

(21) Appl. No.: 18/278,741

(22) PCT Filed: Feb. 26, 2021

(86) PCT No.: PCT/EP2021/054849
　　§ 371 (c)(1),
　　(2) Date: Aug. 24, 2023

(87) PCT Pub. No.: WO2022/179698
　　PCT Pub. Date: Sep. 1, 2022

(65) Prior Publication Data
　　US 2024/0131715 A1　　Apr. 25, 2024
　　US 2024/0227193 A9　　Jul. 11, 2024

(51) Int. Cl.
　　*B25J 9/16*　　　　(2006.01)
　　*G01S 15/08*　　　(2006.01)
　　*G01S 17/08*　　　(2006.01)
(52) U.S. Cl.
　　CPC ........... *B25J 9/1694* (2013.01); *B25J 9/1664* (2013.01); *G01S 15/08* (2013.01); *G01S 17/08* (2013.01)

(58) Field of Classification Search
　　CPC ...... B25J 9/1694; B25J 9/1664; B25J 9/1676; G01S 15/08; G01S 17/08; F16P 3/141;
　　　　　　　(Continued)

(56) References Cited

U.S. PATENT DOCUMENTS

2018/0297506 A1 * 10/2018 Stefan ..................... G01S 15/08

FOREIGN PATENT DOCUMENTS

DE　　102005027522 A1　　12/2006
DE　　102008063081 A1　　8/2010
　　　　　(Continued)

OTHER PUBLICATIONS

DE202013104860 Arbeitsvorrichtung-Translated.pdf (translation of DE-202013104860-U1) (Year: 2025).*
　　　　　(Continued)

*Primary Examiner* — Bao Long T Nguyen
(74) *Attorney, Agent, or Firm* — QUARLES & BRADY LLP

(57)　　　　　　　ABSTRACT

A system and method for determining a minimum distance between an object and an apparatus surface, in particular for determining a minimum distance between an object and an apparatus surface of a handling apparatus, is described. A primary distance of the object is captured as the distance of the object by a distance sensor unit in or on the apparatus surface. A critical point which is at the primary distance from the distance sensor unit and is within a capture range of the distance sensor unit and comes closest to the apparatus surface taking into account a spatial course of the latter is also determined. A minimum distance between the critical point and the apparatus surface is determined.

15 Claims, 4 Drawing Sheets

Figure 1:
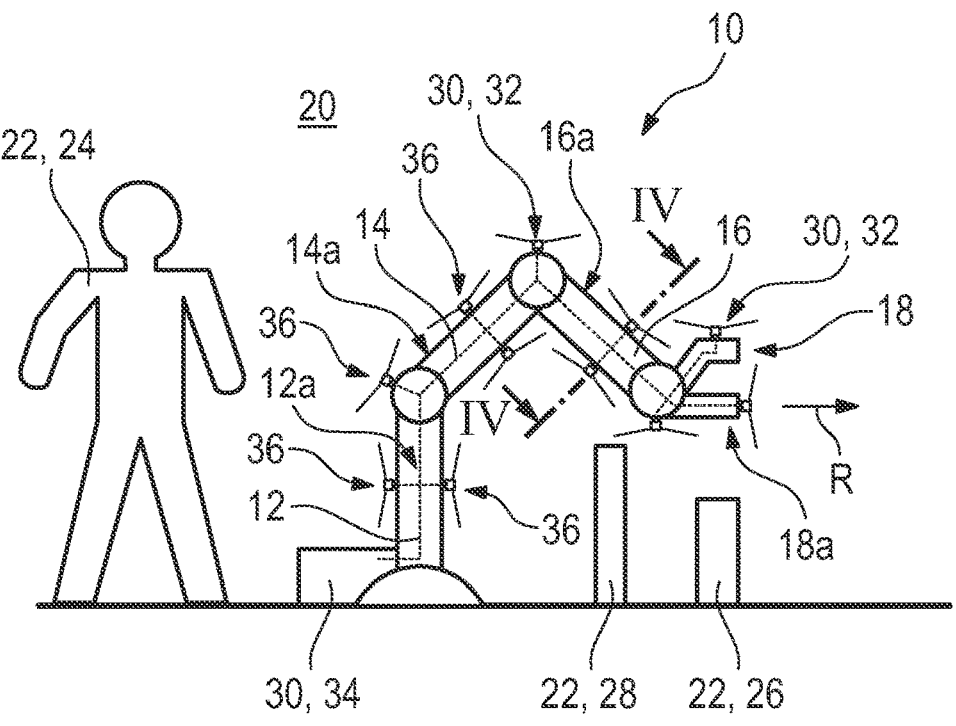

(58) Field of Classification Search
    CPC .......... F16P 3/147; G05B 2219/37425; G05B 2219/40202; G05B 2219/40544; G01C 15/02; G01C 3/32; G01B 11/14; G01B 17/00
    See application file for complete search history.

(56) References Cited

FOREIGN PATENT DOCUMENTS

| | | | | |
|---|---|---|---|---|
| DE | 102010063208 | A1 | 6/2012 | |
| DE | 102012007242 | A1 | 9/2013 | |
| DE | 202013104860 | U1 * | 3/2015 | ........... B25J 13/081 |
| DE | 102015112656 | A1 | 2/2017 | |
| DE | 102016203701 | A1 | 9/2017 | |
| DE | 102016114835 | A1 | 2/2018 | |
| EP | 0518836 | A1 | 12/1992 | |
| EP | 2395274 | B1 | 4/2015 | |
| EP | 3252364 | A1 | 6/2017 | |
| WO | 8403854 | A1 | 10/1984 | |
| WO | 2014056833 | A1 | 4/2014 | |
| WO | 2016020052 | A1 | 2/2016 | |
| WO | 2019233682 | A1 | 12/2019 | |

OTHER PUBLICATIONS

PCT International Search Report and Written Opinion, PCT/EP2021/054849, Nov. 30, 2021, 13 pages.

The Korean Intellectual Property Office, Notice of Grounds for Rejection, from corresponding Korean Patent App. No. 10-2023-7031898, dated Jul. 7, 2025 [14 pgs.].

The European Patent Intellectual Property Office, Office Action, from corresponding European Patent App. No. 21 709 357.4-1009, dated Oct. 14, 2025.

\* cited by examiner

METHOD FOR DETERMINING A MINIMUM DISTANCE BETWEEN AN OBJECT AND AN APPARATUS SURFACE, SAFETY DEVICE FOR A HANDLING APPARATUS HAVING AN APPARATUS SURFACE, AND HANDLING APPARATUS

CROSS REFERENCE TO RELATED APPLICATIONS

This application represents the United States national stage entry of PCT International Application PCT/EP2021/054849 filed Feb. 26, 2021, and published under Publication No. WO 2022/179698 A1 on Sep. 1, 2022, which International Application is incorporated herein in its entirety by reference for all purposes.

The invention relates to a method for determining a minimum distance between an object and an apparatus surface, in particular for determining a minimum distance between an object and an apparatus surface of a handling apparatus.

In addition, the invention is directed towards a safety device for a handling apparatus having an apparatus surface, in particular towards a safety device for a robot having an apparatus surface.

The invention further relates to a handling apparatus, in particular a robot, having an apparatus surface and such a safety device.

Such methods, safety devices and handling apparatuses are known from the prior art. They are used in applications in which the handling apparatus and people share the same working space. This is the case e.g. in the context of human-robot cooperation. In this context it must be ensured that the people present within the working space of the handling apparatus remain safe. Moreover, collisions between the handling apparatus or components thereof and other non-human objects in the working space must be avoided.

Safety devices are used for this purpose which are configured to perform methods for determining distances between people and non-human objects. Movement of the handling apparatus is thereby slowed, stopped or completely impeded in consideration of the measured distances.

For the purpose of easier readability, people and non-human objects will be jointly referred to hereinafter as objects.

Safety devices and methods executable thereby for distance determination are known and make possible a high level of precision for distance determination but with a similarly high level of outlay. In this manner, associated handling apparatuses can be operated safely and efficiently.

The invention is applicable hereto, the object of which is to further improve methods, safety devices and handling apparatuses of the type mentioned in the introduction. In particular, a simple and reliable way to determine distances between objects should be created. It should also be possible to perform such a method with a comparatively low level of outlay. There should be no compromise in relation to operational safety.

The object is achieved by a method of the type mentioned in the introduction comprising the following steps:

a) capturing a primary distance of the object by means of a first distance sensor unit positioned on or in the apparatus surface, wherein the primary distance is the distance between the object and the distance sensor unit, b) determining a critical point which is at the primary distance from the first distance sensor unit and within a capture range of the first distance sensor unit and comes closest to the apparatus surface in consideration of a 3-dimensional course of the apparatus surface, and c) determining the minimum distance between the critical point and the apparatus surface.

Such a method can be performed simply and reliably. In this context, consideration is given to the fact that distance sensor units can typically determine a distance but cannot indicate where within the associated capture range the distance is measured. This problem is solved by determining the critical point and the associated minimum distance. It is impossible for the method to determine a minimum distance which, e.g. owing to a 3-dimensional course of the apparatus surface, is greater than an actual distance. Rather, a somewhat shorter distance is output in case of doubt. The method is thus particularly safe.

The following items of information must be known for the method: course of the apparatus surface at least in the relevant range, position of the distance sensor on the apparatus surface, capture range of the distance sensor unit. This information can easily be stored on a control unit which is configured for performing the method.

It is also understood that a capture range of a distance sensor unit is always selected such that the apparatus surface does not screen it. Otherwise, the distance sensor unit would not be able to be operated with the desired reliability.

Furthermore, in the present case it is assumed that the distance sensor unit has a substantially conical capture range.

The critical point can lie on an edge of the capture range when the apparatus surface is flat or when the apparatus surface is convexly curved in the direction of the object and a radius of curvature of the apparatus surface is greater than the primary distance or when the apparatus surface is concavely curved in the direction of the object. In these cases, the position of the critical point can be determined in a particularly rapid and simple manner. As a result, the minimum distance can likewise be determined in a rapid and simple manner. Information relating to the curvature of the apparatus surface can also be stored on a control unit which is configured for performing the method.

A sensor signal from a second distance sensor unit positioned on or in the apparatus surface is preferably ignored when the second distance sensor unit detects an object. Alternatively, the critical point lies outside a capture range of a second distance sensor unit positioned on or in the apparatus surface when the second distance sensor unit does not detect an object. In the latter case, it can consequently be ruled out that an object is present in the capture range of the second distance sensor unit. Therefore, an object also cannot be present in a possibly provided overlapping region of the capture ranges of the first distance sensor unit and the second distance sensor unit. Accordingly, the critical point also must lie outside of the overlapping region. In the former case, it cannot be determined whether the object captured by the second distance sensor unit is the same object as captured by the first distance sensor unit or a different object. For safety reasons, it must be assumed that these are two different objects. Accordingly, in this case, ignoring the sensor signal generated by the second distance sensor unit results in increased reliability of the first distance sensor unit. It is understood that in a following step the sensor signal from the second distance sensor unit can naturally also be evaluated. In this context, the sensor signal from the first distance sensor unit can be ignored.

If two distance sensor units are provided, a position of the captured object within the associated capture ranges can also be determined. This can be effected e.g. by virtue of the fact that both distance sensor units capture a phase of a signal reflected by the object and so an associated phase shift can be determined. The position within the capture ranges can be deduced from the phase shift.

According to one embodiment, at least two raw distances are determined in each distance sensor unit, wherein the primary distance is the shorter of the raw distances. At least two distance sensors are preferably arranged for determining the raw distances within the distance sensor unit, said sensors having detection ranges which at least partially overlap. The distance sensors used for determining the raw distances are thus redundant. As a result, reliability of the distance sensor unit encompassing same and consequently also of the method in accordance with the invention is increased.

Preferably, the detection ranges of the distance sensors for determining the raw distances overlap such that one detection range lies completely within the other. A raw distance can thus be determined by the two distance sensors in the associated overlapping region. Alternatively, the detection ranges are substantially identical. It is understood that the details relating to the detection ranges are possibly only valid outside of a certain minimum distance. Only insufficient overlapping can be present within the minimum distance owing to the geometric features. In the extreme case, the capture ranges do not overlap at all within the minimum distance.

The raw distances can be determined in accordance with a time-of-flight method by means of different sensor principles. In particular, one of the sensor principles is an electromagnetic, preferably optical, sensor principle and another of the sensor principles is an acoustic sensor principle. In this context, each time-of-flight sensor includes a transmission unit and a reception unit and an evaluation unit. The evaluation unit determines, in dependence upon the running time which a signal output by the transmission unit requires until it is detected by the reception unit, and with knowledge of a wave propagation speed in the relevant space, a sensor signal in the form of a distance value. Time-of-flight sensors thus operate in a comparatively rapid and precise manner. As a result, they are particularly well suited to be used in the context of handling apparatuses or robots. By using different sensor principles, the robustness and error tolerance when determining raw distances can be increased.

A first distance sensor can be an infrared sensor and a second sensor can be an ultrasound sensor. In this thereby ensured that virtually any object used in a typical environment of a handling apparatus, i.e. people clothed in any way and objects made from any material, can be recognised in different environmental conditions (brightness, fog, air humidity, etc.). This applies in particular in comparison with capacitive sensors which operate less reliably in particular with fluctuating moisture in the working space and when dust is present. In addition, some synthetic materials having a dielectric constant close to air cannot be easily recognised with capacitive sensors.

According to one variant, at least one of the distance sensor units has a capture range which can change during operation. In particular, the capture range changes in a time-dependent manner or in dependence upon a measured distance value. In this context, relatively narrow capture ranges which e.g. have the form of a comparatively narrow measuring cone, are useful in the case of comparatively remote objects because the direction in which these objects lie can be better estimated. In contrast, in the case of comparatively close objects, it is advantageous to provide comparatively wide capture ranges e.g. in the form of wide measuring cones, in order to minimise or eliminate gaps in capture. Changing capture ranges thus increase the capture precision as a whole. In the case of ultrasound sensors, e.g. a capture range can be changed in particularly simple manner by changing a sound frequency.

The capture range of at least one distance sensor unit can also be changed by virtue of the fact that the distance sensor unit is mounted in a movable manner and thus the capture range covers another section of the space surrounding the distance sensor unit depending upon the position within the movability of the distance sensor unit.

The object is also achieved by a safety device of the type mentioned in the introduction which includes a first distance sensor unit, which can be positioned on or in the apparatus surface, and an evaluation unit, which is coupled to the distance sensor unit in terms of signal technology and is configured to perform a method in accordance with the invention when the distance sensor unit is in the mounted state. Minimum distances of apparatus surfaces can thus be determined in a simple and reliable manner by means of the safety device. As a result, apparatuses equipped with the safety device, in particular handling apparatuses, can be operated reliably in those working spaces in which objects which are potentially at risk of colliding, and in particular also people, are present.

Moreover, the effects and advantages mentioned in relation to the method are also applicable to the safety device, and vice-versa.

Furthermore, a second distance sensor unit which can be positioned on or in the apparatus surface is coupled to the evaluation unit in terms of signal technology. The safety device can also provide those functions which have already been mentioned in conjunction with the method in accordance with the invention and are based on the use of two distance sensor units.

Preferably, the first distance sensor unit and the second distance sensor unit each comprise a capture range, wherein the capture ranges overlap outside of a predefined safety distance from the distance sensor units. This means that a space outside of the predefined safety distance is reliably illuminated by the distance sensor units. In particular, the space outside of the predefined safety distance is completely illuminated by the distance sensor units, i.e. there are no illumination gaps outside of the predefined safety distance. However, it is also possible to allow illumination gaps outside of the predefined safety distance. However, in that case the distance sensor units are configured and positioned such that the illumination gaps are non-critical in size. This means that the illumination gaps are clearly smaller than the objects to be detected by means of the distance sensor units. As a result, it is achieved that the object to be detected also cannot lie completely within the illumination gap in the least favourable case and thus is always reliably detected. For example, an illumination gap having a cross-section of a few square centimetres can be produced by three partially overlapping illumination cones of adjacent distance sensor units in space. However, this is deemed to be non-critical when people are being detected. As an analogy for the allowable illumination gaps of non-critical size, consideration can be made of a cage formed of a grid. The grid comprises openings but these are sized such that predefined objects cannot pass therethrough. In contrast thereto, illumination gaps which possibly exceed the non-critical size are also permitted within the predefined safety distance. As a whole, the region outside of the safety distance can be illuminated with a high degree of reliability and coverage. However, for this purpose only a minimum number of distance sensor units are required. The design of the safety unit is thus comparatively simple and cost-efficient.

In one embodiment, each of the distance sensor units comprises at least two distance sensors which operate in accordance with a time-of-flight method. In this context, reference can be made to the effects and advantages of the use of time-of-flight sensors which have already been explained.

A detection range of one of the distance sensors and a detection range of the other of the distance sensors can at least partially overlap. In particular, the detection ranges are substantially identical or one of the detection ranges completely encompasses the other detection range. There is thus a certain redundancy in the capture of the distances. As a result, the safety device ensures a high degree of reliability and a high level of safety.

Advantageously, the distance sensors use different sensor principles. In particular, one of the distance sensors uses an electromagnetic, preferably optical, sensor principle and another of the distance sensors uses an acoustic sensor principle. The effects and advantageous already explained in conjunction with the method in accordance with the invention are produced.

Also, in conjunction with the safety device at least one of the distance sensors uses in one of the distance sensor units can have a detection range which can change during operation. In particular, the detection range is set in a time-dependent manner or in dependence upon a measured distance value.

In addition to the ways of changing the detection range already explained in conjunction with the method in accordance with the invention, the safety device can also have in this context a shielding unit, the position of which can be adjusted. A detection range is thus changed by adjusting a position of the shielding unit. The shielding unit can be adjusted e.g. by means of piezo elements. It is understood that for the setting of a detection range, only the relative position between the shielding unit and the associated distance sensor is important. In a similar manner, a fixed shielding unit can also be provided which cooperates with a movably mounted distance sensor.

The distance sensor unit can additionally be selectively deactivatable. This is particularly advantageous when distance sensor units are positioned on an apparatus surface such that in most postures of the associated apparatus, in particular a handling apparatus, the distance sensor unit would capture part of the apparatus surface or of the handling apparatus.

Moreover, the object is achieved by a handling apparatus, in particular a robot, of the type mentioned in the introduction, which comprises a safety device in accordance with the invention, wherein at least a first distance sensor unit of the safety device is positioned in or on the apparatus surface. Therefore, distances between objects and the apparatus surface can be reliably captured. As a result, the handling apparatus can be operated in a safe and reliable manner in a working space in which both people and/or non-human objects potentially at risk of colliding are present.

The handling apparatus or the robot thus carries the distance sensor units required for safeguarding. This is also referred to as apparatus-centric or robot-centric safeguarding.

Moreover, the effects and advantages mentioned in conjunction with the method in accordance with the invention and/or the safety device in accordance with the invention are also applicable to the handling apparatus in accordance with the invention, and vice-versa.

The handling apparatus can operate in a distance-controlled operating mode if only objects outside of a predefined safety distance are captured by means of the safety device. Alternatively, the handling apparatus can operate in a force-controlled operating mode or stop when objects are captured within the safety distance. In this context, the force-controlled operating mode is associated with a reduction in the working or travel speed of the handling apparatus, and so if there is contact between the handling apparatus and a person, the contact force is so low that no injuries can occur. Alternatively, the handling apparatus stops. It thus no longer moves. Only when objects are no longer captured in the safety distance can a decision be made as to the restarting of the movement. In this manner, high operational safety is also ensured.

In addition to the predefined safety distance, a predefined threshold distance can also be provided. This is greater than the predefined safety distance, i.e. lies in a region outside same. The handling apparatus can be configured such that, for particular operating parameters in dependence upon whether an object is detected within the predefined threshold distance or outside of the predefined threshold distance, different limit values can be applied. For example, outside of the predefined threshold distance a first, preferably high maximum travel speed is allowed, wherein within the predefined threshold distance, but outside of the safety distance, a second, reduced maximum travel speed is allowed. It is understood that a plurality of such threshold distances can also be defined. In this manner, the handling apparatus can be operated in an efficient whilst safe manner.

In this context, it is also advantageous to set the safety distance and/or the threshold distance in a speed-dependent manner. A variable of the safety distance is directed to the so-called stopping distance, i.e. the distance the handling apparatus still travels after the emergency shut-off switch is actuated before it comes to a standstill. This stopping distance must be shorter than the safety distance. Otherwise, an undesired collision may occur.

The handling apparatus can also be equipped with a direction recognition unit. It can thus be recognised whether the handling apparatus is moving towards or away from a captured object. For this purpose, the minimum distances captured by means of the distance sensor units can be evaluated in combination with movement data of the handling apparatus.

For the case that objects at risk of colliding are always positioned in the working space of the handling apparatus and/or close to a working space limit, the handling apparatus can furthermore be programmed such that it always works in the force-controlled mode in the region of these objects. This can be effected by specific programming or by a learning run. The purpose of such a functionality resides in the fact that people who were previously hidden by such objects can enter the capture range of the distance sensor units behind such objects. The concealing object can also be parts of the handling apparatus itself.

As already mentioned, the handling apparatus is in particular a robot. This is designed e.g. as a hinged arm robot, gantry robot, delta robot or hexapod robot. A hinged arm robot can be a bent arm robot, a dual arm robot or a so-called SCARA robot.

Figure 2:
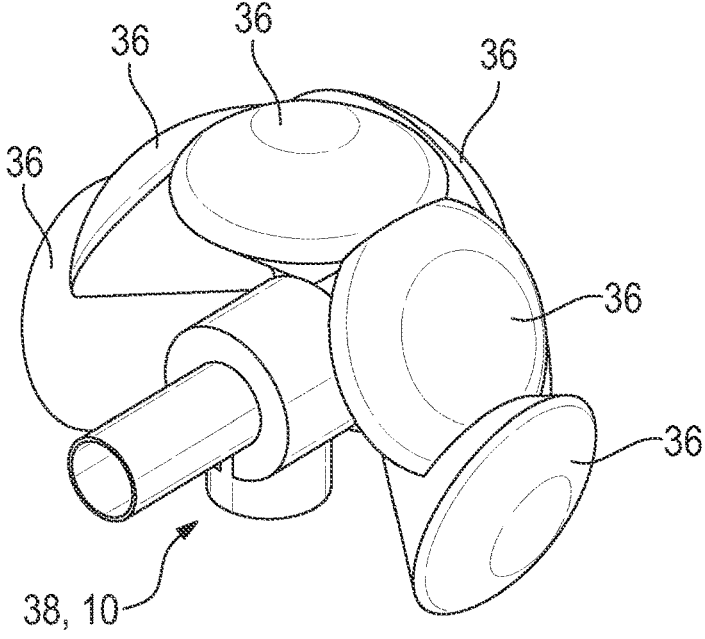
Figure 3:
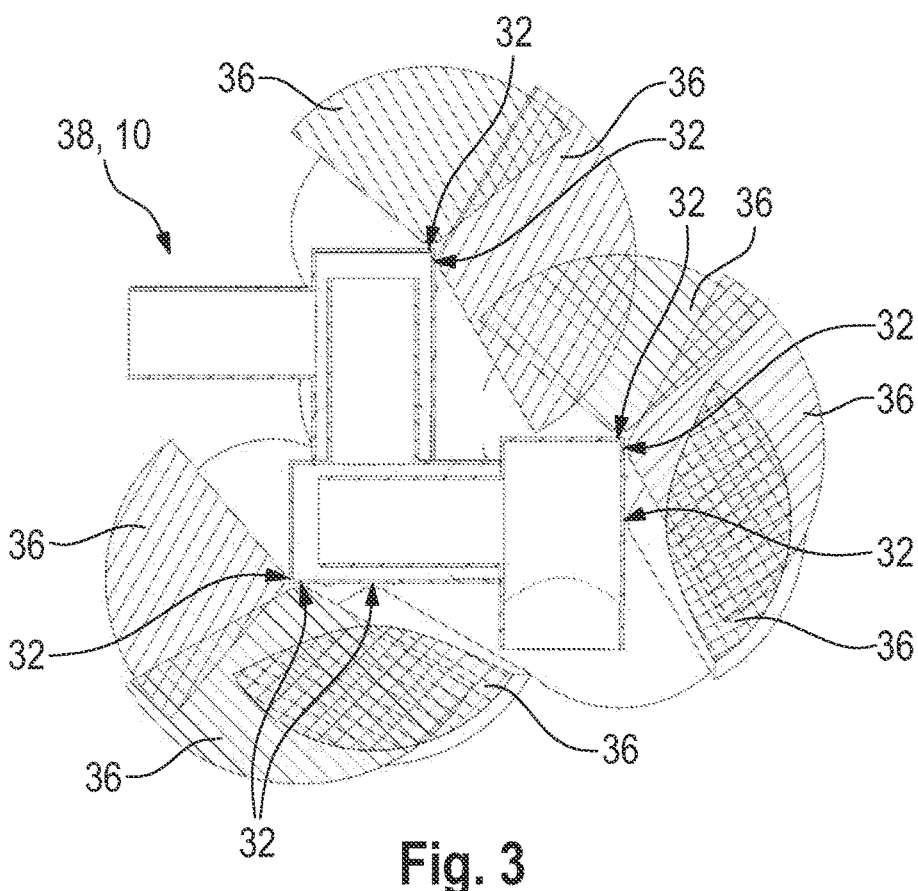
Figure 4:
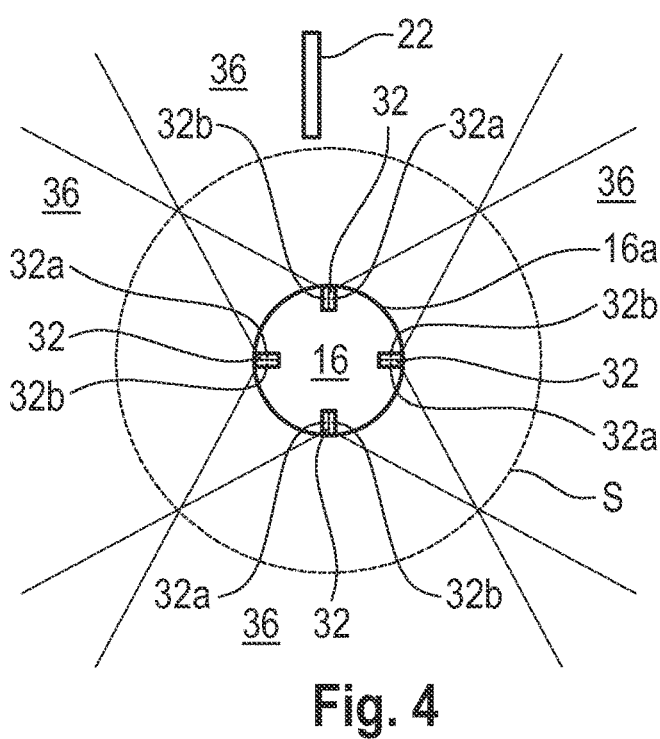
Figure 5:
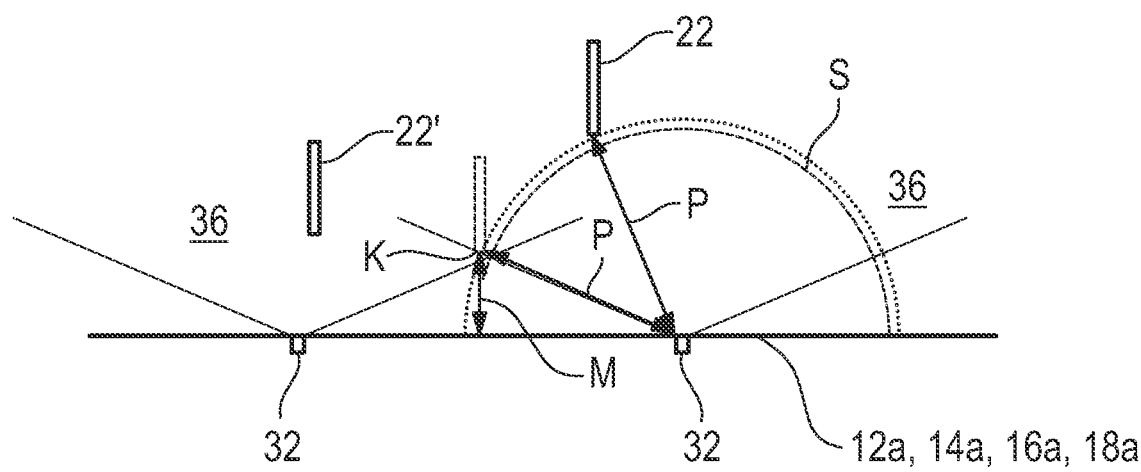
Figure 6:
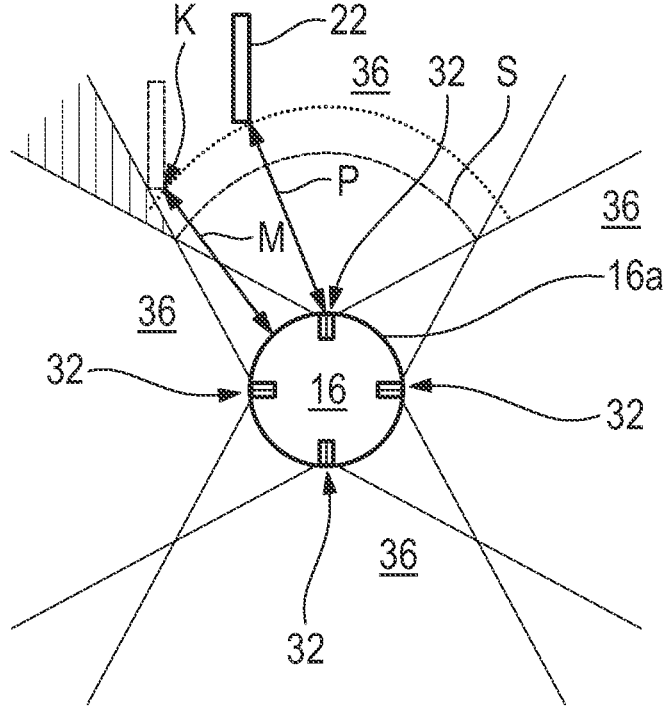
Figure 7:
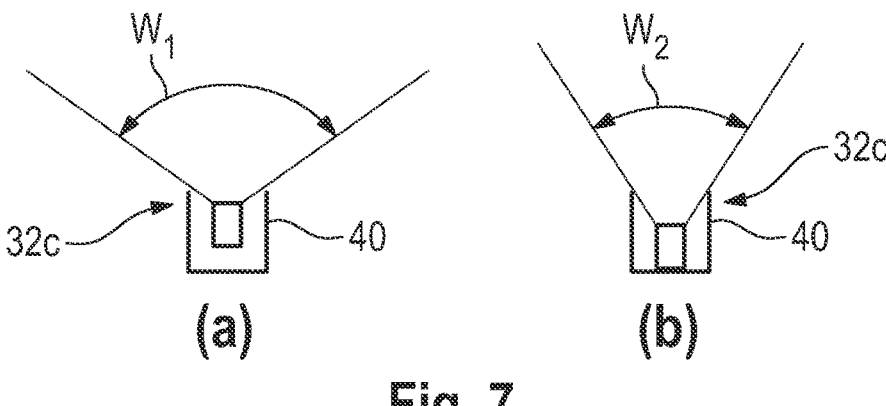
Figure 8:
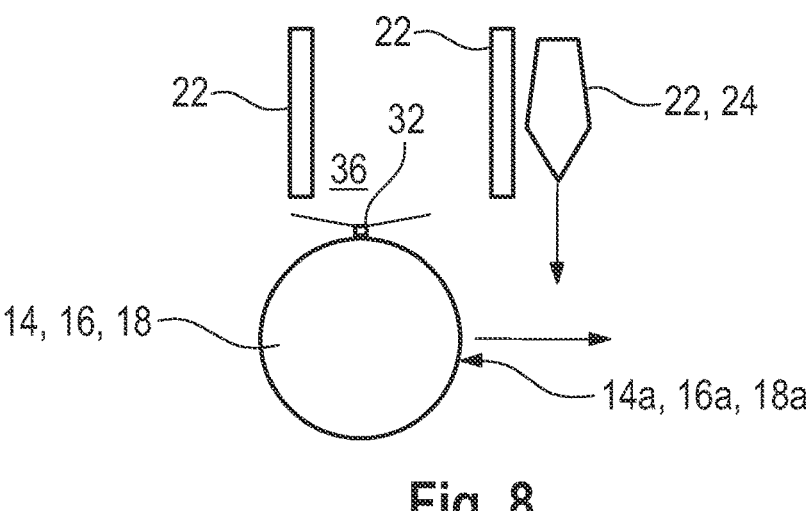
Figure 9:
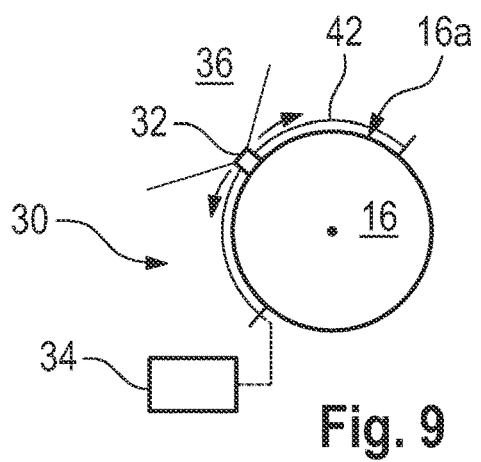

The invention will be explained hereinafter with the aid of various exemplified embodiments which are illustrated in the attached drawings. In the drawing:

FIG. 1 shows a handling apparatus in accordance with the invention which is equipped with a safety device in accordance with the invention, by means of which a method in accordance with the invention can be performed, wherein in addition a person and two non-human objects are shown, FIG. 2 shows an exemplified part of a handling apparatus in accordance with the invention and the components positioned thereon of a safety device in accordance with the invention, FIG. 3 shows a cross-sectional view of another exemplified part of a handling apparatus in accordance with the invention and the components positioned thereon of a safety device in accordance with the invention, FIG. 4 shows the handling apparatus of FIG. 1 in a sectional view along plane IV-IV, FIG. 5 shows an illustration for explaining the method in accordance with the invention, wherein a planar apparatus surface of a handling apparatus in accordance with the invention is the basis therefor, FIG. 6 shows a further illustration for explaining the method in accordance with the invention, wherein the method is explained by means of an illustration, corresponding to FIG. 4, using the handling apparatus of FIG. 1, FIG. 7 shows a detailed view of an exemplified distance sensor of the handling apparatus of FIG. 1 in two operating states, FIG. 8 shows a schematic illustration of the handling apparatus of FIG. 1 in a specific operating situation, and FIG. 9 schematically shows a variant of the safety device in accordance with the invention having a moveable distance sensor unit.

FIG. 1 shows a handling apparatus 10 which in the illustrated embodiment is designed as a bent arm robot.

The handling apparatus 10 comprises a base 12, a first arm 14, a second arm 16 and a gripper 18.

The first arm 14 is connected to the base 12 and to the second arm 16 in an articulated manner. On its side opposite the first arm 14, the second arm 16 is coupled to the gripper 18 in an articulated manner.

The handling apparatus 10 comprises a plurality of apparatus surfaces 12a, 14a, 16a, 18a.

More precisely, the base 12 is delimited by the apparatus surface 12a. The first arm 14 comprises the apparatus surface 14a and the second arm 16 comprises the apparatus surface 16a. The gripper 18 comprises further apparatus surfaces 18a, of which only one is provided with a reference sign by way of example.

The handling apparatus 10 can be operated in a working space 20 in which objects 22 are provided which are additionally positioned such that the handling apparatus 10 or parts thereof may collide with them.

Specifically, such objects 22 are provided in the illustrated embodiment in the form of a person 24, in the form of a comparatively small block 26 and in the form of a comparatively large block 28.

In order to be able to operate the handling apparatus 10 in such a working space 20 safely, i.e. so as to exclude undesired collisions between the objects 22, it is equipped with a safety device 30.

The safety device 30 comprises a plurality of distance sensor units 32, each positioned on one of the apparatus surfaces 12a, 14a, 16a, 18a and of which only some are provided with a reference numeral in FIG. 1.

Furthermore, the safety device 30 comprises an evaluation unit 34. All of the distance sensor units 32 are coupled to the evaluation unit 34 in terms of signal technology.

In the embodiment illustrated in FIG. 1, a total of eleven distance sensor units 32 can be seen.

Each of the distance sensor units 32 has a capture range 36 which is substantially conical in the illustrated embodiment. Limits of the capture range 36 are shown in the direct environment of the associated distance sensor unit 32, in each case by two thin lines. For improved clarity, again, only some of the capture ranges 36 are provided with a reference sign in FIG. 1.

The capture ranges 36 can at least partially overlap, as is shown in particular in FIGS. 2 and 3, which each show exemplified components 38 of the handling apparatus 10 with associated distance sensor units 32 and their associated capture ranges 36.

The capture ranges 36 of the distance sensor units 32 thus form, at least in selected regions of the handling apparatus 10, a type of sleeve around the handling apparatus 10, within which objects 22 are detected and distances between the objects 22 and the apparatus surfaces 12a, 14a, 16a, 18a can be determined.

As can be seen in particular in FIG. 4, the distance sensor units 32 are arranged such that the associated capture ranges 36 overlap only outside of a predefined safety distance S.

It is thereby ensured that objects 22 can be reliably captured outside of the safety distance S.

However, this also means that it is accepted that capture gaps occur within the safety distance S, i.e. in FIG. 4 between the apparatus surface 16a and the circle representing the safety distance S.

However, with such an arrangement of the distance sensor units 32 an overall reliable monitoring, via sensors, of the working space 20 can be achieved with a manageable number of distance sensor units 32. In other words, such an arrangement provides a good compromise between the outlay, in particular financial outlay, for the distance sensor units 32 and the coverage of the working space 20 by the capture ranges 36.

The handling apparatus 10 can, in this configuration, always be operated in a safe and reliable manner despite the accepted capture gaps.

This is due to the fact that the handling apparatus 10 can be operated in two different operating modes.

It operates in a distance-controlled operating mode when the safety device 30, more specifically the distance sensor units 32, merely captures objects 22 outside of the predefined safety distance S.

In FIG. 4, by way of example an object 22 is shown outside of the safety distance S.

As soon as an object is captured in the safety distance S, i.e. as soon as in FIG. 4 the object 22 touches the circular line representing the safety distance S, the handling apparatus 10 moves into a force-controlled operating mode.

In such an operating mode, a travel speed of the handling apparatus 10 is reduced so much that in particular a collision with the person 24 does not result in injuries.

Alternatively, the handling apparatus 10 can be stopped for as long as the object 22 is captured in the safety distance S.

In order to further increase the operational safety of the handling apparatus 10, each distance sensor unit 32 is also equipped with two distance sensors 32a, 32b (see FIG. 4 in conjunction with FIG. 1).

All of the distance sensors 32a, 32b operate in accordance with the so-called time-of-flight method, i.e. each of the distance sensors comprises a transmission unit which is not illustrated in more detail and transmits a sensor signal, and an associated reception unit which can capture a signal possibly reflected by an object 22 within the capture range 36. Using the time required for the sensor signal from the time of transmission to the time of capture thereof, and a signal propagation speed within the medium provided in the working space 20, e.g. air, a distance can be thus calculated.

The distance sensors 32a, 32b of a distance sensor unit 32 are arranged such that the detection ranges of the distance sensors 32a, 32b are substantially identical. A detection range of the distance sensor 32 thus substantially corresponds to the capture range 36. The same applies for the detection range of the distance sensor 32b.

Furthermore, distance sensors 32a, 32b which operate according to different sensor principles are always used within a distance sensor unit 32. In the illustrated embodiments, the distance sensor 32a is an infrared sensor and the distance sensor 32b is an ultrasound sensor.

Within the safety device 30, all of the distances measured by the distance sensors 32a, 32b are communicated to the evaluation unit 34.

The evaluation unit 34 is configured, with respect to each of the apparatus surfaces 12a, 14a, 16a, 18a and each of the distance sensor units 32, to perform a method for determining a minimum distance between a detected object 22 and the apparatus surface 12a, 14a, 16a, 18a.

The distance values determined by the distance sensors 32a, 32b are used in this method as input parameters and are processed as raw distances.

Using the raw distances, initially a primary distance P is determined.

The primary distance P corresponds to the shorter of the two raw distances determined by the distance sensors 32a, 32b.

Such a primary distance P is shown in FIGS. 5 and 6.

In other words, it is now thus known that an object 22 to be detected is located within the capture range 36 of the evaluating distance sensor unit 32 and is at a primary distance P from the distance sensor unit 32.

However, depending upon the course of the associated apparatus surface 12a, 14a, 16a, 18a in space, this primary distance P is not necessarily a minimum distance between the object 22 and the apparatus surface 12a, 14a, 16a, 18a.

In this context, FIG. 5 shows an example in which the apparatus surface 12a, 14a, 16a, 18a is substantially flat.

Another example of a course of the apparatus surface 16a is shown in FIG. 6. In this case, the apparatus surface 16a is convexly curved.

A critical point K must subsequently be determined, said point lying at the primary distance P from the relevant distance sensor unit 32 and within the associated capture range 36, but comes closest to the apparatus surface 12a, 14a, 16a, 18a in consideration of the 3-dimensional course thereof.

Since, in the embodiment of FIG. 5, the apparatus surface is flat, this critical point K lies on an edge of the capture range 36 of the distance sensor unit 32. For illustrative purposes, the object 22 is shown in an associated position in dashed lines. It can also be stated that the object 22 is shifted or projected theoretically into the critical point K for determining the minimum distance.

In the embodiment of FIG. 6, the critical point K does not lie on an edge of the capture range 36 of the considered distance sensor unit 32.

This is due to the fact that the apparatus surface 16a is convexly curved in the direction of the object 22 and a radius of curvature of the apparatus surface 16a is shorter than the distance P.

In a subsequent step, the minimum distance M between the critical point K and the apparatus surface 12a, 14a, 16a, 18a is determined. This minimum distance M is used for operating the handling apparatus 10 which thus always operates with a distance value which ensures safe operation.

In this context, individual distance sensor units 32 can also be deactivated or the signals generated thereby can be ignored.

This will be explained with reference to FIGS. 5 and 6.

In a case in which in FIG. 5 the distance sensor unit 32 illustrated on the left and also the distance sensor unit 32 illustrated on the right are active, then using the sensor values generated thereby a differentiation cannot be made as to whether the distance sensor unit 32 illustrated on the left also captures the object 22, the minimum distance of which is to be determined, or whether the distance sensor unit 32 illustrated on the left captures another object denoted by 22' in FIG. 5.

In the example of FIG. 5, the distance sensor unit 32 illustrated on the left captures both objects 22, 22'.

In such a case, i.e. in a case in which a distance sensor unit 32 adjacent to the distance sensor unit 32 to be evaluated also captures an object, initially the adjacent distance sensor unit 32, i.e. the distance sensor unit 32 illustrated on the left in FIG. 5, must be deactivated or the signals generated thereby must be ignored. Only then can the object 22 be reliably recognised and an associated minimum distance M be determined.

In a subsequent step, the distance sensor unit 32 illustrated on the right in FIG. 5 is deactivated or the signals generated thereby are ignored. In this manner, by using each of the distance sensor units 32 a reliable minimum distance M can be calculated and used for operating the handling apparatus 10.

In the case of FIG. 5, the distance sensor units 32 are evaluated successively.

Only in the case illustrated in FIG. 6, in which the adjacent distance sensor unit 32 in the counter-clockwise direction does not capture any object 22 at all, can and should the signals from this distance sensor unit 32 be evaluated substantially simultaneously.

In this case, it is absolutely impossible for the object 22, the minimum distance M of which is to be determined, to be located within the capture range of the adjacent sensor unit 32. Therefore, the object 22 must also lie outside of an overlapping region of the capture ranges of the two adjacent distance sensor units 32. In FIG. 6, the overlapping region is emphasised with hatching. The object 22 can thus be located more precisely than in a case in which merely a single distance sensor unit 32 is available.

In addition, a distance sensor unit 32 must be able to be selectively deactivated if the handling apparatus 10 assumes a posture in which the relevant distance sensor unit 32 would merely capture components of the handling apparatus 10.

In one variant, one or more distance sensors 32c which have an adjustable detection range can also be used within a distance sensor unit 32. This will be explained with reference to FIG. 7.

The distance sensor 32c shown in FIG. 7 comprises a shielding device 40 which is displaceably mounted.

In the configuration of FIG. 7(a), the shielding device 40 is in a retracted position and so a conical detection range having the cone angle $W_1$ is produced.

In the configuration of FIG. 7(b), the shielding device 40 is in an extended position. Owing to the resulting shielding effect, a conical capture range is produced having a cone angle $W_2$ which is clearly smaller than the cone angle $W_1$.

Such distance sensors 32c are advantageously operated in a configuration corresponding to FIG. 7(b), i.e. with a comparatively narrow detection range, if it is merely a matter of capturing objects 22 at a comparatively far distance away from the handling apparatus 10. In this manner, it is easier to resolve the position of the object 22 relative to the handling apparatus 10.

In contrast, the configuration of FIG. 7(a) is preferably used when objects 22 in close proximity are to be detected. In this manner, complete coverage of the environment of the relevant component of the handling apparatus 10 is produced, in particular in close proximity. In other words, in this manner a safety distance S (see FIG. 4) can be kept relatively short.

In the evaluation unit 34, the previously described distances detected by means of the distance sensor units 32, in particular the determined minimum distances M are always processed in connection with a movement direction of the handling apparatus 10.

The latter information is made available in this context by a control unit, not illustrated in more detail, of the handling apparatus 10. This control unit is specifically configured to control or regulate movements of the handling apparatus 10.

Therefore, by means of the evaluation unit 34 distances can be captured in relation to a current movement direction of the handling apparatus 10. It can thus be determined whether a detected distance lies at the front or rear in a movement direction of the handling apparatus 10. In other words, it is established whether the handling apparatus 10 is moving towards or away from the detected object 22.

It is understood that distances to the rear in the movement direction are clearly less critical for the operation of the handling apparatus 10 in terms of safety than distances to the front in the movement direction.

If for example the gripper 18 of the handling apparatus 10 moves in the illustration of FIG. 1 in the direction R, then the position of the person 24 is considered substantially to be non-critical. As a result, a travel speed of the handling apparatus 10 does not need to be restricted owing to the person 24.

In the illustrated configuration, only the objects 26, 28 are thus to be considered when adjusting the travel speed.

The evaluation unit 34 is furthermore configured to store information regarding objects 22 located within the working space 20 and to classify these objects 22.

This is particularly important for those objects 22 which are arranged within the working space 20 such that capture ranges 36 can be concealed or limited by distance sensor units 32 (see FIG. 8). For such objects, the situation may arise that another object, in particular a moving object, emerges so-to-speak from the shadows and thus directly enters the proximity of the handling apparatus 10, without this approach being able to be captured by means of the distance sensor units 32.

This is of particular importance if a person 24 can appear from behind such an object at least partially concealing a capture range 36.

The handling apparatus must thus be always operated in the environment of such objects with such a reduced travel speed that it can still stop in good time when an object 22 or the person 24 appears. Alternatively, it must be operated in the force-controlled mode in the environment of such objects.

Storing and classifying information relating to such critical objects 22 on the evaluation unit 34 can be effected e.g. within the scope of a learning run.

FIG. 9 shows a variant of the safety device 30.

The distance sensor unit 32 is arranged to be movable on the apparatus surface 16a.

As indicated by the two arrows, the distance sensor unit 32 can be moved along a rail 42.

In this manner, a single distance sensor unit 32 can detect objects in a comparatively large space.

It is understood that the safety device 30 can also comprise a plurality of such movable distance sensor units 32.

The movement range of the distance sensor unit 32 can be selected in an application-specific manner. Contrary to that shown in FIG. 9, in this context a substantially annularly circumferential rail 42 can also be provided so that the distance sensor unit 32 can be moved over the entire circumference of the arm 16.

What is claimed is:

1. A method for determining a minimum distance between an object and an apparatus surface of a handling apparatus, the method including steps comprising:
   a) capturing a primary distance of the object by using a first distance sensor unit positioned on or in the apparatus surface, wherein the primary distance is the distance between the object and the first distance sensor unit,
   b) determining a critical point which is at the primary distance from the first distance sensor unit and within a capture range of the first distance sensor unit and comes closest to the apparatus surface in consideration of a 3-dimensional course of the apparatus surface, and
   c) determining the minimum distance between the critical point and the apparatus surface; and
   wherein the minimum distance between the critical point and the apparatus surface is smaller than or equal to the primary distance.

2. The method as claimed in claim 1, wherein the critical point lies on an edge of the capture range, when the apparatus surface is flat, or when the apparatus surface is convexly curved in the direction of the object and a radius of curvature of the apparatus surface is greater than the primary distance, or when the apparatus surface is concavely curved in the direction of the object.

3. The method as claimed in claim 1, wherein a sensor signal from a second distance sensor unit positioned on or in the apparatus surface is ignored when the second distance sensor unit detects an object, or the critical point lies outside of a capture range of the second distance sensor unit positioned on or in the apparatus surface when the second distance sensor unit does not detect an object.

4. The method as claimed in claim 3, wherein at least two raw distances are determined in each of the first distance sensor unit and the second distance sensor unit, and wherein the primary distance is the shorter of the raw distances.

5. The method as claimed in claim 4, wherein the at least two raw distances are determined using a time-of-flight method and different sensor principles, wherein one of the sensor principles is an electromagnetic sensor principle and another of the sensor principles is an acoustic sensor principle.

6. The method as claimed in claim 3, wherein at least one of the first distance sensor unit or the second distance sensor unit comprises a capture range which can change during operation.

7. A safety device for determining a minimum distance between an object and an apparatus surface of a handling apparatus comprising an apparatus surface, the safety device comprising:

a first distance sensor unit positioned on or in the apparatus surface; and an evaluation unit which is communicatively coupled to the distance sensor unit and configured to:

a) determine a primary distance of the object using the first distance sensor unit, wherein the primary distance is the distance between the object and the first distance sensor unit, b) determining a critical point which is at the primary distance from the first distance sensor unit and within a capture range of the first distance sensor unit and comes closest to the apparatus surface in consideration of a 3-dimensional course of the apparatus surface, and c) determining the minimum distance between the critical point and the apparatus surface; and wherein the minimum distance between the critical point and the apparatus surface is smaller than or equal to the primary distance.

8. The safety device as claimed in claim 7, further comprising a second distance sensor unit positioned on or in the apparatus surface and communicatively coupled to the evaluation unit.

9. The safety device as claimed in claim 8, wherein the first distance sensor unit and the second distance sensor unit each comprise a capture range and the capture ranges overlap outside of a predefined safety distance from the first distance sensor unit and the second distance sensor unit.

10. The safety device as claimed in claim 9, wherein the first distance sensor unit and the second distance sensor unit comprise at least two distance sensors which operate according to a time-of-flight method.

11. The safety device as claimed in claim 10, wherein a detection range of one of the first distance sensor unit or the second distance sensor unit and a detection range of another of the first distance sensor unit or the second distance sensor unit at least partially overlap.

12. The safety device as claimed in claim 10, wherein the first distance sensor unit and the second distance sensor unit include different sensors, including an electromagnetic sensor and an acoustic sensor.

13. The safety device as claimed in claim 7, wherein the distance sensor unit can be selectively deactivated.

14. A system including a handling apparatus having an apparatus surface and a safety device, the system comprising:

a first distance sensor unit;

an evaluation unit which is communicatively coupled to the distance sensor unit and configured to:

a) determine a primary distance of the object using the first distance sensor unit, wherein the primary distance is the distance between the object and the first distance sensor unit, b) determining a critical point which is at the primary distance from the first distance sensor unit and within a capture range of the first distance sensor unit and comes closest to the apparatus surface in consideration of a 3-dimensional course of the apparatus surface, and c) determining the minimum distance between the critical point and the apparatus surface; and wherein at least a first distance sensor unit is positioned in or on the apparatus surface, and wherein the minimum distance between the critical point and the apparatus surface is smaller than or equal to the primary distance.

15. The handling apparatus as claimed in claim 14, wherein the handling apparatus operates in a distance-controlled operating mode if only objects outside of a predefined safety distance are captured the safety device, and the handling apparatus operates in a force-controlled operating mode or stops when objects in the safety distance are captured.

* * * * *